(No Model.)
B. F. SPARR.
ANTIFRICTION BUSHING.
No. 567,728. Patented Sept. 15, 1896.
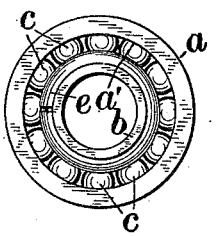
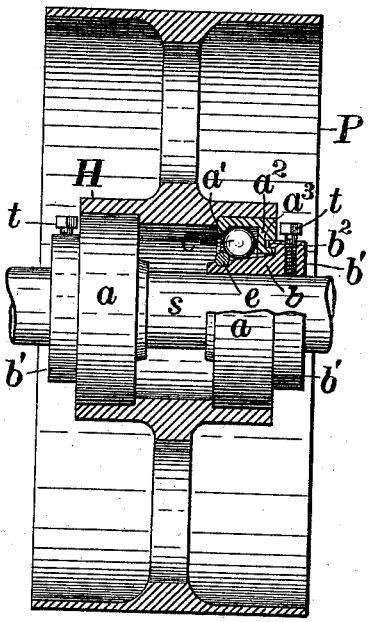
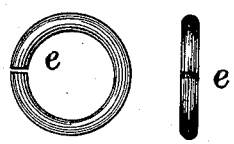
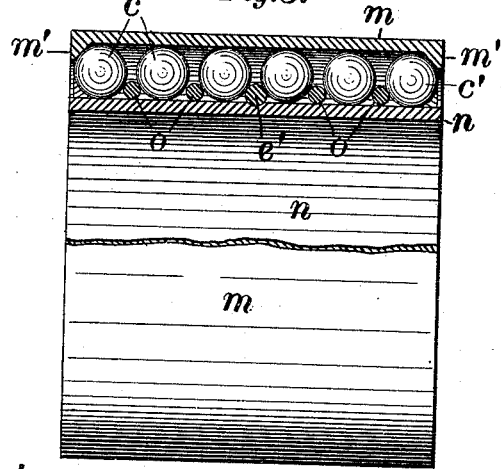
Attest:
John Sherman
William Batson
Inventor.
Benjamin F. Sparr, per
By Henry D. Miller, atty

UNITED STATES PATENT OFFICE.

BENJAMIN FRANKLYN SPARR, OF NEWARK, NEW JERSEY.

ANTIFRICTION-BUSHING.

SPECIFICATION forming part of Letters Patent No. 567,728, dated September 15, 1896.

Application filed December 31, 1895. Serial No. 573,896. (No model.)

*To all whom it may concern:*

Be it known that I, BENJAMIN FRANKLYN SPARR, a citizen of the United States, residing at Newark, in the county of Essex and State of New Jersey, have invented a certain new and useful Improvement in Antifriction-Bushings, fully described and represented in the following specification and the accompanying drawings, forming a part of the same.

This invention relates to an improvement in antifriction-bushings comprising two concentric rings, the one surrounding the other, and a series of spherical balls confined within the intervening space; and its object is to provide an effective and convenient means of locking the several members together, and to adapt the same for excluding dust and other foreign matter when in operation.

The invention consists partly in a split ring applied to a suitable peripheral groove on one of such concentric members of the bushing, and partly in fitting said members together laterally by an annular tongue-and-groove joint.

In the annexed drawings, Figure 1 is an elevation of a shaft carrying a loose pulley having the opposite ends of its hub recessed for the application of the bushings mounted upon the shaft, the pulley and one of the bushings being in section where hatched. Fig. 2 is an elevation of the inner end of one of the bushings. Fig. 3 is a side elevation, and Fig. 4 an edge view, of one of the split rings $e$ shown in the preceding figures. Fig. 5 is a side elevation, partly in section where hatched, of a bushing containing several series of antifriction-balls.

Referring to Figs. 1 to 4, inclusive, the pulley P is shown provided with a hub H, having its opposite ends recessed to fit the exterior of the outer member $a$ of the bushing, whose concentric inner member $b$ is fitted upon the supporting-shaft $s$, so as to form with the outer member an annular intervening space in which the series of spherical balls $c$, constituting the intermediate member of the bushing, is confined.

The outer member consists of a cylindrical ring $a$, provided at one edge of its inner face with an inwardly-beveled rib $a'$ and at the opposite edge with a flange $a^2$, having a lateral annular groove $a^3$. The inner member of the bushing consists of a ring $b$, of slightly taper form exteriorly, having at one end a boss $b'$, provided with a set-screw $t$ and with a lateral rib or tongue $b^2$, fitted to the lateral groove $a^3$ in the flange $a^2$, to form a dust-proof joint therewith for the exclusion of foreign matter from the interior of the hub and the rolling members of the bushing. At the opposite and smaller end of the inner ring $b$ is formed an annular groove, fitted to and adapted to receive the removable confining split ring $e$, which is inserted therein for retaining the balls $c$ and the inner member of the bushing in their normal relation.

In assembling the parts of the bushing together the inner ring $b$ is partially inserted within the outer ring $a$ and the balls $c$ inserted in the intervening space, after which the ring $b$ is thrust into its proper relation to the ring $a$ and the split ring $e$ slipped into its place in the grooved end of the member $b$, whereby the balls are effectively confined between the two concentric members $a$ and $b$ for the convenient handling of the bushing when detached from the shaft and pulley, while the removability of the split ring from the member $b$ permits the balls to be withdrawn from the bushing for cleaning or renewal when desired. The recesses at the opposite ends of the hub H are fitted closely to the exterior of the outer members, which are thus adapted to be held frictionally from rotation when the bushing is fixed upon the shaft within the hub by means of the set-screw $t$.

It will be observed that in order to compensate for wear it is merely necessary to loosen the set-screw, press the boss $b'$ toward the hub to force the balls against the outer ring $a$ by means of the conical face of the inner ring, and then tighten the set-screw. It is evident, however, that other means of adjustment may be readily employed to effect the same result.

When it is desired to adapt the bushing for sustaining a greater load than that for which a single series of balls is adapted, the construction illustrated in Fig. 5 may be employed, wherein the outer ring $m$ is provided internally with a groove or channel having at its edges the ribs $m'$, the inner ring $n$ is provided externally and intermediate to its edges with a split ring $e'$, fitted to a suitable annular peripheral groove, and several interposed series of antifriction-balls $c'$ are disposed upon opposite sides of the ring $e'$ with intermediate spacing rings $o$.

It will be observed that the ribs $m'$ at opposite edges of the outer member serve to prevent the lateral displacement of the inner member $n$ through the engagement of the interposed balls $c'$ with the split ring $e'$, similarly to the operation of the ring $e$ in the construction illustrated in Figs. 1 and 2; but that where only one interposed annular series of balls is employed one of such split rings would be required upon each side of the same in order to preserve the initial relation of the balls to the inner member in case the adjacent faces of the inner and outer rings are parallel instead of relatively inclined, as in Figs. 1 and 2.

Having thus set forth the nature of the invention, what I claim herein, and desire to secure by Letters Patent, is—

1. In an antifriction-bushing composed of two concentric rings, the one surrounding the other, and an intermediate series of spherical balls confined within the intervening space, the combination, with one of said rings formed with a peripheral groove as described, of a split ring fitted to and inserted within the said peripheral groove, as and for the purpose set forth.

2. The antifriction-bushing formed of the outer ring $a$ having the rib $a'$ and flange $a^2$ with lateral annular groove $a^3$, the inner ring $b$ with boss $b'$ having lateral annular tongue $b^2$ fitted to said lateral groove $a^3$ in the flange $a^2$ and removable split ring $e$, and interposed series of spherical balls $c$, substantially as shown and described and for the purpose set forth.

In testimony whereof I have hereunto set my hand in the presence of two subscribing witnesses.

BENJAMIN FRANKLYN SPARR.

Witnesses:
HENRY J. MILLER,
WILLIAM BATSON.